United States Patent
Smithey et al.

(10) Patent No.: US 7,764,924 B1
(45) Date of Patent: Jul. 27, 2010

(54) METHOD AND SYSTEM FOR REPEATER SHUTDOWN BASED ON RECEIVED POWER

(75) Inventors: Paul S. Smithey, Olathe, KS (US); Gene S. Mitchell, Blue Springs, MO (US); Timothy W. Sill, Platte City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 528 days.

(21) Appl. No.: 11/754,086

(22) Filed: May 25, 2007

(51) Int. Cl.
*H04B 3/36* (2006.01)
*H04B 7/14* (2006.01)
*H04B 7/15* (2006.01)
*H04B 7/185* (2006.01)
*H04B 7/19* (2006.01)
*H04B 7/165* (2006.01)
*H04B 7/00* (2006.01)

(52) U.S. Cl. .................. 455/7; 455/11.1; 455/13.1; 455/13.4; 455/24; 455/522; 455/16

(58) Field of Classification Search .......... 455/7, 455/13.4, 24, 11.1, 13.1, 522, 16; 370/318
See application file for complete search history.

(56) References Cited

U.S. PATENT DOCUMENTS

| | | | | |
|---|---|---|---|---|
| 4,065,729 | A * | 12/1977 | Gover et al. | 372/50.21 |
| 6,157,812 | A * | 12/2000 | Sarraf | 455/13.4 |
| 6,690,650 | B1 * | 2/2004 | Stener | 370/241 |
| 2002/0028655 | A1 * | 3/2002 | Rosener et al. | 455/16 |
| 2003/0123401 | A1 * | 7/2003 | Dean | 370/318 |
| 2004/0157561 | A1 * | 8/2004 | Akerberg | 455/67.11 |
| 2004/0203911 | A1 * | 10/2004 | Masuda et al. | 455/456.1 |
| 2006/0251021 | A1 * | 11/2006 | Nakano et al. | 370/331 |
| 2009/0043926 | A1 * | 2/2009 | Hwang et al. | 710/51 |
| 2009/0197551 | A1 * | 8/2009 | Paraskake et al. | 455/179.1 |
| 2010/0009625 | A1 * | 1/2010 | Chami et al. | 455/11.1 |

* cited by examiner

*Primary Examiner*—Matthew D Anderson
*Assistant Examiner*—Bobbak Safaipour

(57) ABSTRACT

Controlling a cellular radio frequency repeater amplifier and their gain factors. In preferred embodiments, the method is used in personal home repeaters that may be used by wireless services users. The repeaters are preferably configured to automatically control their setting without requiring supervision or control by the wireless service provider. The wireless provider also need not have knowledge of where the repeater devices are placed within the network. The preferred system and methods reduce potential problems that may arise when repeaters with fixed gain are placed within close proximity of a cell site. The preferred methods shut down the forward and reverse amplifiers based on the received signal level from the base station.

16 Claims, 3 Drawing Sheets

METHOD AND SYSTEM FOR REPEATER SHUTDOWN BASED ON RECEIVED POWER

FIELD OF THE INVENTION

The present invention relates to telecommunications and, more particularly, to signal repeater devices used to extend or improve wireless coverage in specific areas.

BACKGROUND

In a cellular wireless communication system, such as a code division multiple access (CDMA) system for instance, base stations are positioned throughout a coverage area and emit radio frequency radiation patterns that define cells. Mobile stations operating in a given cell may then wirelessly communicate with the serving base station, and the base station may provide connectivity with further network components such as switches and gateways that connect with transport networks.

In a CDMA system, each cell is typically divided into a number of sectors, each of which is identified by a specific pseudo-noise offset (i.e., "PN offset") of a specific spreading sequence that is used to encode communications with mobile stations operating in the cell. At any given instant, a mobile station may thus operate in a given sector, and may thereby communicate with the serving base station using the PN offset of that sector. (In practice, an idle mobile station may communicate on a single PN offset (i.e., in a single sector) at once; an active mobile, on the other hand, might communicate on multiple PN offsets (i.e., in multiple sectors) at once, although a dominant one of those active PN offsets might be the focus of communications at any given moment.)

Unfortunately, in some wireless networks, the cells may not seamlessly cover an entire area, so there may be a hole in coverage between cells. To solve this problem, a wireless carrier may install a repeater that functions to extend the range of a given cell or sector, so as to fill in the hole in coverage. Such a repeater may be able to receive a signal distorted by transmission losses and to regenerate or replicate the signal. The repeater typically includes a donor antenna that communicates with a base station, a coverage antenna that communicates with mobile stations, and an amplifier circuit that boosts communications from the base station to the mobile stations as well as from the mobile stations to the base stations. For example, the repeater may be positioned between a mobile station and a base station to intercept signals sent between them. The repeater amplifies the power of these intercepted signals and sends amplified versions of these signals to the mobile station or the base station. Therefore, the repeater effectively extends the range of a given cell by boosting communications between a mobile station and a base station.

In practice, the donor antenna of a repeater may receive signals from multiple base stations and multiple base station sectors (i.e., signals with multiple PN offsets) at once and boost all of those signals. In addition, the repeater receives signals from mobile stations, boosts the signals, and radiates the amplified signals to one or all nearby base stations.

However, radiating the amplified signals to the base stations can decrease the capacity of base stations because it raises the noise level received by the base station. The increase in noise levels reduces the signal-to-noise ratio of the signals received by the base station. The noise is typically thermal noise generated from active devices in the repeater, and if it reaches the receiver of a base station transceiver at a high enough power level, the receiver will be desensitized causing loss of coverage area.

SUMMARY

Described herein is a method and apparatus for controlling a repeater amplifier gain factors. In preferred embodiments, the method is used in personal home repeaters that may be used by wireless services users. The repeaters are preferably configured to automatically control their setting without requiring supervision or control by the wireless service provider. The wireless provider also need not have knowledge of where the repeater devices are placed within the network. The preferred system and methods reduce potential problems that may arise when repeaters with fixed gain are placed within close proximity of a cell site. The preferred methods shut down the forward and reverse amplifiers based on the received signal level from the base station.

In one preferred method, the cellular signal repeater measures a receive signal strength of a forward channel signal received from a base transceiver station, and then sets a gain value of the repeater's reverse channel amplifier to a first gain value when the received signal strength is below a first threshold. Additionally, it sets the gain value of the repeater's reverse channel amplifier to a gain factor of zero when the receive signal strength is above the first threshold.

The threshold is preferably −78 dBm, although it may also be selected from the range of approximately −82 dBm to −75 dBm. The gain value is preferably a fixed value in the range of 50 dB to 105 dB, and more preferably is set to approximately 80 dB. The threshold may also include hysteresis such that the threshold is incrementally higher when the receive signal strength is increasing. The presence of hysteresis avoids rapid or repeated toggling of the amplifier when the received signal level varies around the threshold. The hysteresis preferably provides for an incremental range around a desired threshold, and the incremental range may be 1 dB, or as much as 5 db or 10 dB.

The repeater includes a forward channel amplifier, and in some preferred embodiments, the method includes setting a gain value of the repeater's forward channel amplifier to be equal to the gain value of the repeater's reverse channel amplifier. In addition, some embodiments may use thresholds to turn on and off the forward channel amplifier. In particular, it may set the gain value of the repeater's forward channel amplifier to a first gain value when the received signal strength is below a second threshold, and set the gain value of the repeater's forward channel amplifier to a gain factor of zero when the receive signal strength is above the second threshold. Preferably, the threshold for the forward channel is higher than the reverse channel threshold, such as between approximately −82 dBm and −78 dBm. In an alternative embodiment, the method may include powering down the repeater when the received signal strength is above a threshold.

These as well as other aspects, advantages, and alternatives will become apparent to those skilled in the art by reading the following detailed description with reference to the accompanying drawings.

DETAILED DESCRIPTION

Wireless Communication System

Figure 1:
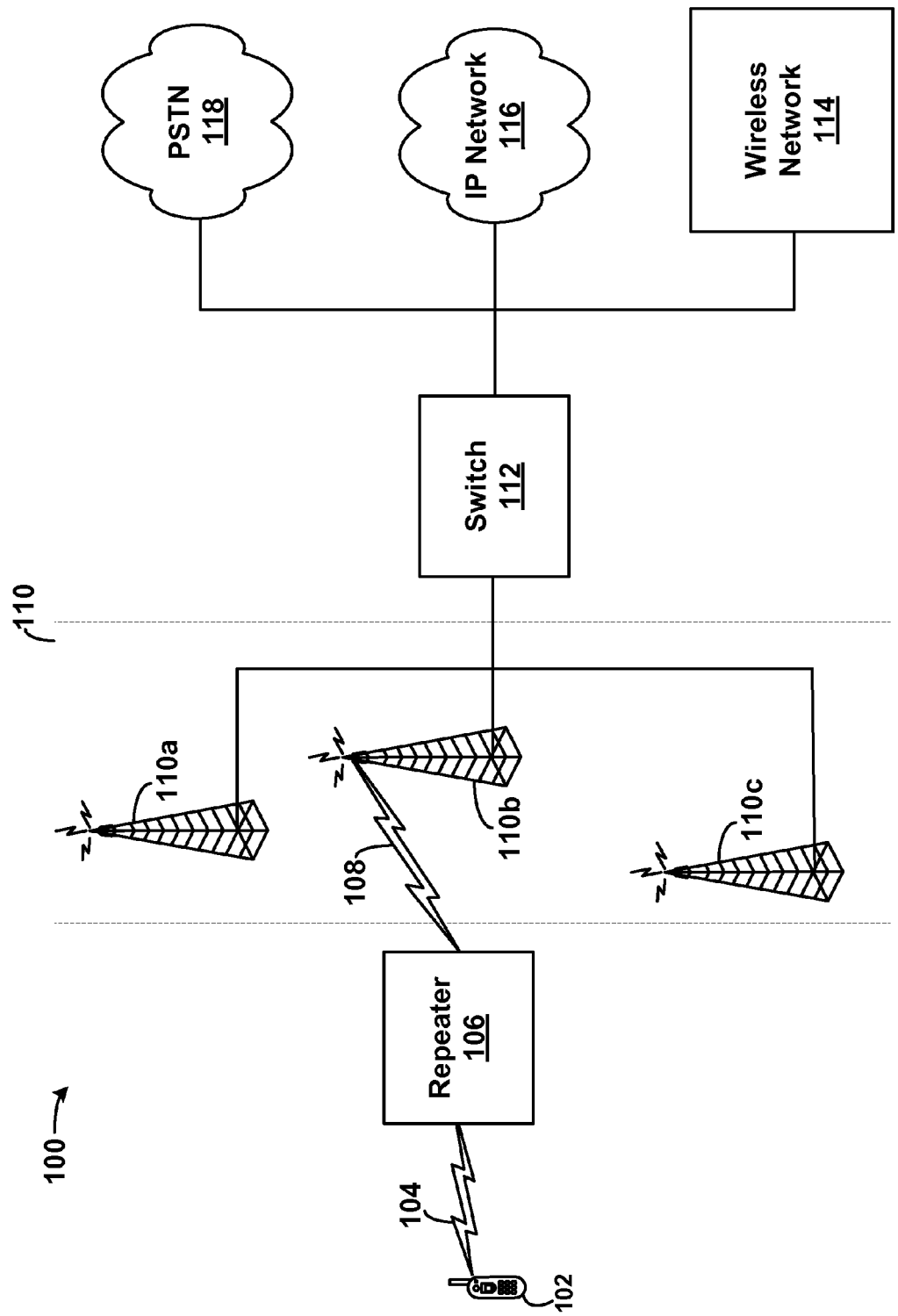
FIG. 1 is a simplified block diagram of a wireless communication system.

Referring to the drawings, FIG. 1 is a simplified block diagram of an exemplary wireless communication system 100. It should be understood, however, that this and other arrangements and processes described herein are set forth for purposes of example only, and other arrangements and elements (e.g., machines, interfaces, functions, orders of elements, etc.) can be added or used instead and some elements may be omitted altogether. Further, as in most telecommunications applications, those skilled in the art will appreciate that many of the elements described herein are functional entities that may be implemented as discrete components or in conjunction with other components, in any suitable combination and location, and by hardware, firmware, and/or software (e.g., one or more processors programmed with machine language instructions to carry out the functions described).

Exemplary system 100 includes at its core a radio access network (RAN) 110, which provides connectivity between one or more mobile stations and one or more transport networks. RAN 110 includes base transceiver stations (BTS) 110a, 110b and 110c (e.g., a Motorola SC4812, SC611, SC614 or SC4850, or the like) that radiate radio frequency energy to produce a cellular air interface coverage area in which mobile stations can operate. (As used herein, the term "cellular" contemplates WWAN technology such as CDMA, TDMA, AMPS, GSM, WiMAX or other such technologies now known or later developed.)

As shown in the example arrangement of FIG. 1, network 100 includes a mobile station (MS) 102 coupled via link 104 to a repeater 106. In turn, repeater 106 is coupled via link 108 to a base station 110b. Base station 110b and other base stations 110a and 110c are coupled to a switch 112, which is in communication with a wireless network 114, an Internet protocol (IP) network 116, and a Public Switched Telephone Network (PSTN) 118. Switch 112 may also be in communication with other transport networks as well.

The network 100 may be divided geographically into a number of cell sites (or simply "cells"), which are defined by the coverage areas of respective base stations. Each base station transceives with a number of mobile stations that reside within its radio coverage area. In practice, base stations are deployed so that each cell partially overlaps with other cells in the vicinities of their boundaries. The overlapping of cells permits mobile stations to maintain continuous (or near continuous) communications with the called party while moving between cells.

Cells are arranged in clusters, and usually each cluster uses the entire allocated frequency spectrum. Clusters are designed in a fashion so that the limited spectrum is repeatedly used over large geographic areas, with each cluster supporting a substantially same numbers of users. Co-channel interference results from cells that are assigned the same frequency being spaced too close together. As the traffic increases on these cells, the interference rises as the amount of forward link communications (e.g., base station to the mobile) increases.

A cellular network should be designed to maximize the carrier-to-cochannel interference (C/I) ratio (or referred to as the Chip Energy to total Interference ratio ($E_C/I_O$), e.g., where $I=I_{SC}+I_{OC}$, and where SC is same cell interference and OC is other cell interference). The carrier-to-cochannel interference ratio is a ratio of the energy of a pilot signal to the total power in the channel. The total power in the channel includes the pilot signal, pilots from other base stations, traffic, and other channels and noise. One way to maximize the carrier to interference ratio is to increase the frequency re-use distance, i.e., increase the distance between cells using the same set of transmission frequencies. For example, in an advanced mobile phone system (AMPS) system, C/I is equal to about 18 dB and the minimum required separation of cells, based on C/I=18 dB, is about 4.6R, where R is the radius of the cell. This means that the signal from the communicating cell is 18 dB larger than the interfering signal coming from a neighboring cell (or cells). When the network is loaded with calls to its capacity, the received C/I is just sufficient to meet link requirements, but will not meet the requirements if another user is added to the link. Therefore, the C/I is also a measure of capacity of the cells.

Most cell sites are usually further divided geographically into a number of sectors and each sector is defined respectively by radio frequency (RF) radiation patterns from antenna components of the respective base station. FIG. 1 illustrates three base stations 110a-c, which comprise three cells. The size and shape of each cell may vary due to location of the cell (e.g., urban vs. rural area) or other network design factors. Furthermore, network 100 may include more or fewer base stations, or the existing base stations can be arranged in an entirely different manner as well.

The RF radiation pattern from the antenna components of a respective base station produces an air interface, such as link 108, which provides a communication path between repeater 106 and the base station 110b. Similarly, repeater 106 communicates with MS 102 through link 104. MS 102 can then communicate with base station 110b through repeater 106. MS 102 can communicate through this path with entities on network 100, such as IP network 116, or with other mobile stations.

Wireless Communications

Wireless signaling between MS 102 and base station 110b may operate according to any wireless network protocol, such as global system for mobile communications (GSM), time division multiple access (TDMA), code division multiple access (CDMA), or that defined by IEEE 802.16 (known also by WiMAX), for example. The specific protocol depends upon how voice or data signals are transferred between the MSs and base stations, as well as the utilization of transmission frequencies, considering available bandwidth and the network's capacity constraints.

In a CDMA network, cell sites may operate with multiple carrier frequencies. On a given frequency in a CDMA system, multiple communication channels exist, each distinguished by a "Walsh code." Walsh code is a term used for a digital modulation code that distinguishes individual signals on the RF carrier frequency being transmitted.

Repeating Wireless Signals

Figure 2:
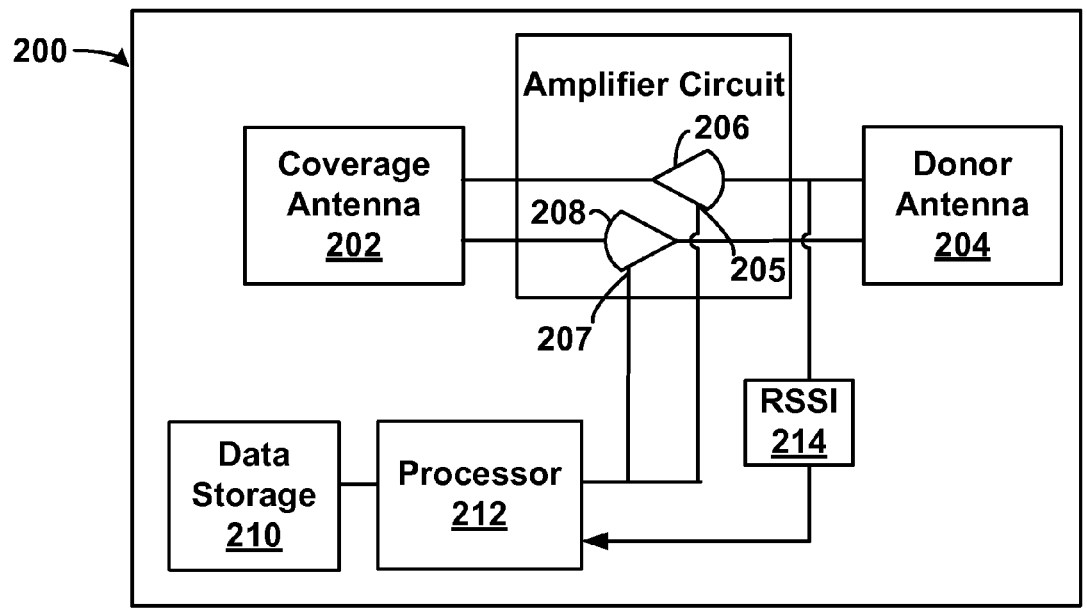
FIG. 2 is a simplified block diagram of a wireless repeater.

FIG. 2 illustrates one embodiment of a repeater 200 that may operate according to an exemplary embodiment of the present invention. Repeater 200 is preferably an analog repeater that may only be able to amplify the signal, and includes a coverage antenna 202 that communicates with mobile stations, a donor antenna 204 that communicates with a base station, a forward channel amplifier 206 that boosts communications from the base station to mobile stations, and a reverse channel amplifier 208 that boosts communications from the mobile stations to the base station.

Coverage and donor antennas 202 and 204 may be any type of antenna or antenna array, and can be configured in any desired manner. For example, coverage and/or donor antennas 202 and 204 may be omni-directional antennas or directional antennas. In addition, coverage and/or donor antennas 202 and 204 may include more than one antenna element. For example, coverage and/or donor antennas 202 and 204 may include multiple antennas each positioned to transmit wireless signals in a respective direction. In addition, to provide directional antenna capabilities without using directional antennas, antennas or antenna elements could also be mounted on a stepper motor, which could incrementally change the direction in which the antennas transmit wireless signals.

Thus, in one preferred embodiment, the CDMA repeater device comprises a donor antenna 204 for communicating with a base station; a coverage antenna 202 for communicating with a mobile station; an adjustable gain reverse channel amplifier 208 having an adjustable gain value. The adjustable gain reverse channel amplifier 208 has an input connected to the coverage antenna 202 and an output connected to the donor antenna 204, wherein the adjustable gain value is set in response to received signal power from the base transceiver station as determined by RSSI measurement device 214. The repeater may also include a control communication interface circuit for receiving gain adjustment controls or data needed to make the gain determination from a remote location.

Furthermore, the phase of radiating components can be varied electronically to produce a moving radiation pattern with no moving parts. For example, coverage and/or donor antennas 202 and 204 may be phased array (PA) antennas. A PA antenna comprises many radiating elements each with a phase shifter. The radiating elements may be spaced such that together they can radiate wireless signals to a desired direction. Each element can produce a signal with a fixed amplitude and phase angle for a certain drive voltage. By assembling a number of antenna elements to form the PA antenna, the direction of a main beam (its directivity) can be controlled through the adjustment of the signal amplitude and phase of each antenna element in the array. Beams are formed by shifting the phase of the signal emitted from each radiating element, to provide constructive/destructive interference so as to steer the beams in a desired direction. The signal can be amplified by constructive interference in the main direction. The beam sharpness or directivity can be improved by the destructive interference. The use of the PA antenna has the effect of summing the signal at points in space where it is desirable with constructive inference and taking advantage of destructive interference to cancel out the signal in space where the signal is not desired.

Amplifier circuits 206, 208 operate to amplify signals received from the mobile station and base station. The amplified signals can then be transmitted by coverage antenna 202 or donor antenna 204. The amplifier circuits 206, 208 may include a number of amplifiers and filters in any type of desired arrangement, for example.

In one embodiment, the repeater includes (i) a donor antenna 204 for receiving radio frequency signals from a base transceiver station (BTS) and for transmitting radio frequency (RF) signals to the BTS; (ii) a receive signal strength measurement device 214 to measure signal strength received from the BTS; (iii) a coverage antenna 202 for receiving RF signals from a wireless subscriber device; (iv) a reverse channel amplifier 208 connected to the coverage antenna 202 to receive RF signals from the coverage antenna 202, amplify the RF signals, and provide the amplified RF signals to the donor antenna 204 for transmission to the BTS, the reverse channel amplifier including a gain control input 207; (v) a gain setting module 212 that receives an indication of signal strength measurements obtained from the receive signal strength measurement device 214, and connected to the reverse channel amplifier gain control input 207 to control the reverse channel amplifier 208 gain factor.

In another embodiment, the cellular signal repeater device 200 comprises (i) a donor antenna 204 to receive radio frequency signals from a base transceiver station; (ii) a forward channel amplifier 206 having an input connected to the donor antenna 204 and an output providing amplified RF signals received from the donor antenna 204, wherein the forward channel amplifier also includes a gain control input 205; (iii) a coverage antenna 202 connected to the forward channel amplifier 206 output, the coverage antenna 202 transmitting the amplified RF signals for reception by a wireless subscriber device; (iv) a receive signal strength indicator (RSSI) measurement device 214 to measure signal strength received from the BTS; and (v) a gain setting module 212 that receives an indication of signal strength measurements obtained from the receive signal strength measurement device 214, and connected to the forward channel amplifier gain control input 205 to control the forward channel amplifier 205 gain factor.

The receive signal strength measurement device 214 preferably measures a signal power level in a cellular carrier frequency band. It may be implemented with a cascaded bandpass filter, rectifier and low pass filter, or with other circuits or structures known to those of skill in the art. The gain setting module 212 is preferably a microprocessor or microcontroller, and it sets the forward channel amplifier gain factor to a first value when the receive signal strength is below a threshold, and sets the amplifier gain factor to zero when the receive signal strength is above the threshold. In preferred embodiments, the threshold is selected from the range of approximately −75 dBm to −78 dBm.

Figure 3:
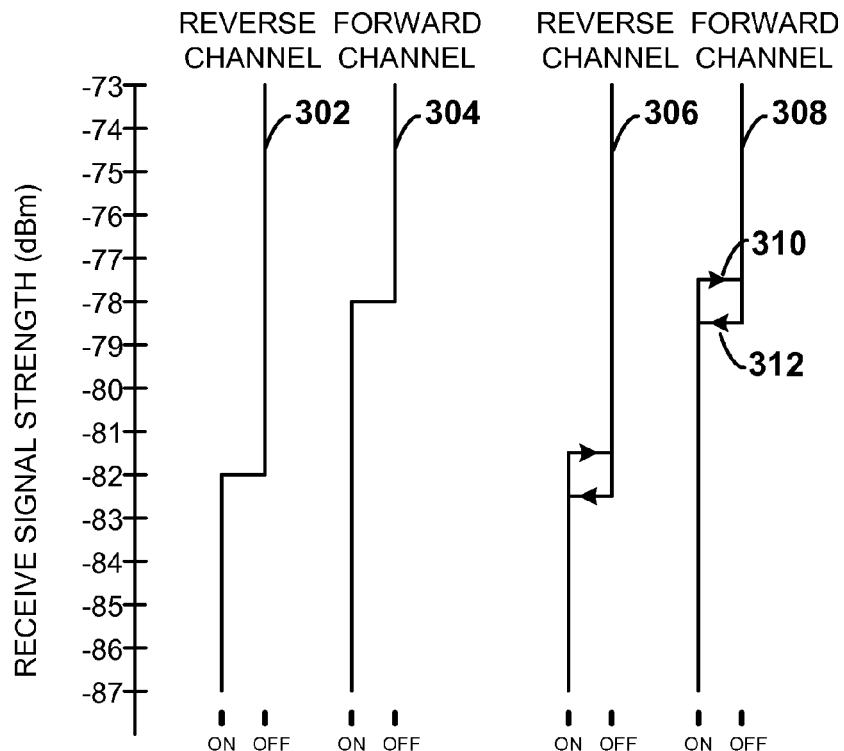
FIG. 3 is a diagram depicting amplifier control as a function of received signal strength.

With respect to status lines 302, 304, 306, and 308 of FIG. 3, the operation of the repeater so as to control the gain factors of the forward and reverse channel amplifiers will be described. The status lines depict whether the amplifier (forward or reverse channel amplifier) is "on" or "off". In the "off" state, the amplifier will have a gain factor of zero. In the "on" state, the amplifier will have a predetermined gain value, preferably in the range of 50 dB to 105 dB, and in one embodiment is set to 80 dB of gain.

In a preferred embodiment, the forward channel amplifier is enabled, or turned on, as indicated by line 304 when the RSSI is below a threshold, which is depicted as −78 dBm for purposes of illustration. This threshold may be set at any value, but in particular, the range of −75 dBm to −82 dBm is preferred. In another embodiment, the reverse channel amplifier is similarly enabled for RSSI levels below a threshold, which is chosen for exemplary purposes to be −82 dBm as shown by status line 302.

In an alternative embodiment, the gain setting module may further include hysteresis to prevent rapid toggling of the amplifier gain factor setting. Thus, in status line 306, 308 the amplifiers are turned on at a higher threshold than where they were turned off. For example, as the RSSI decreases on status line 308, the forward channel amplifier is turned on at a threshold of −78.5 dBm as shown by arrow 312. However, as the RSSI increases, the forward channel amplifier is not turned off again until the RSSI reaches −77.5 dBm. Thus, the hysteresis provides an incremental change in the threshold depending on whether the signal power is increasing or decreasing. The presence of hysteresis avoids rapid or repeated toggling of the amplifier when the received signal level varies around the threshold. The hysteresis preferably provides for an incremental range around a desired threshold, and the incremental range may be 1 dB, or as much as 5 dB or 10 dB.

In a further alternative embodiment, the entire repeater may be put in a standby state if the RSSI is sufficiently high. That is, gain setting module 212 may provide a power down control signal to the repeater when the receive signal strength is above a threshold. This threshold is selected from the range of −78 dBm to −70 dBm.

Figure 4:
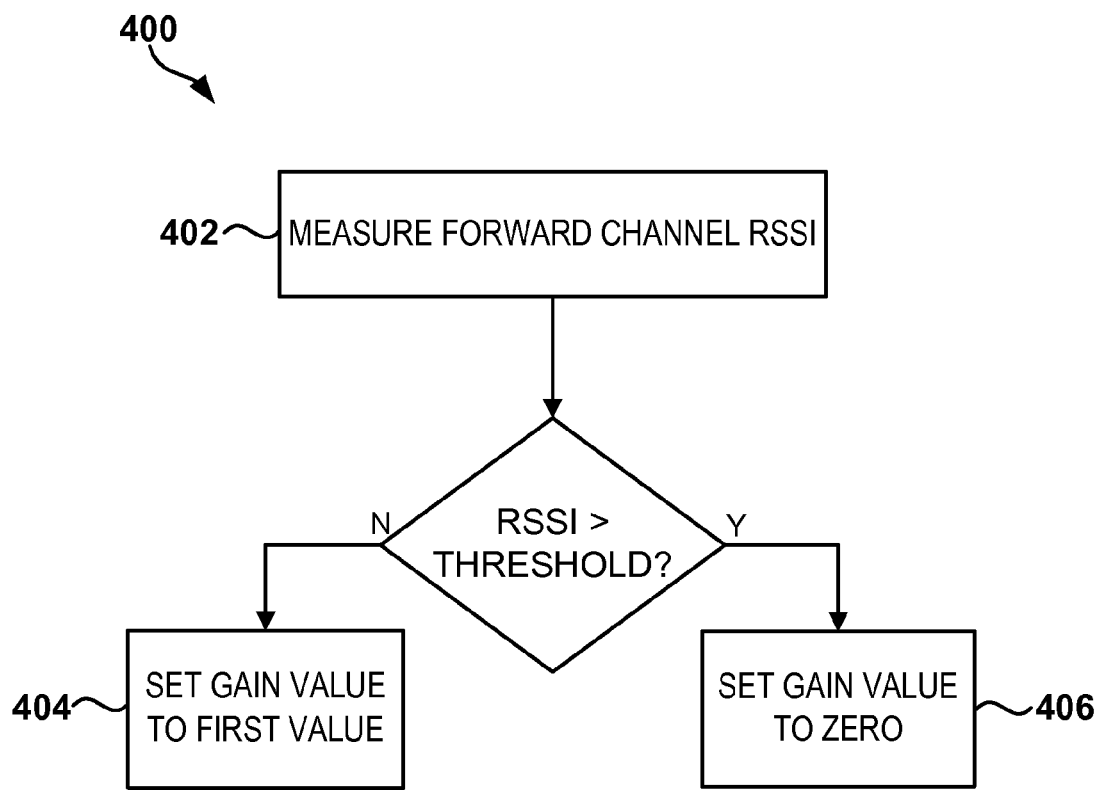
FIG. 4 is a flow diagram of a preferred method of controlling a repeater.

A preferred method 400 will now be described with respect to FIG. 4. At step 402, the cellular signal repeater measures a receive signal strength of a forward channel signal received from a base transceiver station. At step 404, the repeater sets a gain value of the repeater's reverse channel amplifier to a first gain value when the received signal strength is below a first threshold as shown by step 404. It sets the gain value of the repeater's reverse channel amplifier to a gain factor of zero when the receive signal strength is above the first threshold as shown by step 406. The threshold is preferably −78 dBm, although it may also be selected from the range of approximately −82 dBm to −75 dBm. The gain value is preferably a fixed value in the range of 50 dB to 105 dB, and more preferably is set to approximately 80 dB.

While the control of the reverse channel amplifier is important so as to reduce noise interference seen by the BTS, it is also desirable to control the forward channel amplifier. Thus, as described above, some embodiments may use thresholds to turn on and off the forward channel amplifier. In particular, it may set the gain value of the repeater's forward channel amplifier to a first gain value when the received signal strength is below a second threshold, and set the gain value of the repeater's forward channel amplifier to a gain factor of zero when the receive signal strength is above the second threshold. Preferably, the threshold for the forward channel is higher than the reverse channel threshold, such as between approximately −82 dBm and −78 dBm. In an alternative embodiment, the method may include powering down the repeater when the received signal strength is above a threshold.

An exemplary embodiment of the invention has been described above. Those skilled in the art will understand, however, that changes and modifications may be made to this embodiment without departing from the true scope and spirit of the present invention, which is defined by the claims.

The invention claimed is:

1. A method comprising:
    at a cellular signal repeater, measuring a receive signal strength of a forward channel signal received from a base transceiver station;
    setting a gain value of the repeater's reverse channel amplifier to a first gain value when the received signal strength is below a first threshold;
    setting the gain value of the repeater's reverse channel amplifier to a gain factor of zero when the receive signal strength is above the first threshold;
    setting a gain value of the repeater's forward channel amplifier to a first gain value when the received signal strength is below a second threshold, wherein the second threshold is higher than the first threshold; and
    setting the gain value of the repeater's forward channel amplifier to a gain factor of zero when the receive signal strength is above the second threshold.

2. The method of claim 1, wherein the first threshold is −78 dBm.

3. The method of claim 1, wherein the first threshold is −82 dBm.

4. The method of claim 1, wherein the first threshold is selected from the range of −82 dBm to −75 dBm.

5. The method of claim 1, wherein the first gain value is a fixed value in the range of 50 dB to 105 dB.

6. The method of claim 1, wherein the first gain value is approximately 80 dB.

7. The method of claim 1 wherein the first threshold includes hysteresis such that the first threshold is incrementally higher when the receive signal strength is increasing.

8. The method of claim 1, wherein the second threshold is between approximately −82 dBm and −78 dBm.

9. The method of claim 1 wherein the first threshold includes hysteresis such that the first threshold is incrementally higher when the receive signal strength is increasing.

10. The method of claim 1 further comprising powering down the repeater when the received signal strength is above the second threshold.

11. A cellular signal repeater device comprising:
    a donor antenna, the donor antenna for receiving radio frequency signals from a base transceiver station (BTS) and for transmitting radio frequency (RF) signals to the BTS;
    a receive signal strength measurement device to measure signal strength received from the BTS;
    a coverage antenna for receiving RF signals from a wireless subscriber device;
    a reverse channel amplifier connected to the coverage antenna to receive RF signals from the coverage antenna, amplify the RF signals, and provide the amplified RF signals to the donor antenna for transmission to the BTS, the reverse channel amplifier including a gain control input;
    a reverse channel gain setting module that receives an indication of signal strength measurements obtained from the receive signal strength measurement device, and connected to the reverse channel amplifier gain control input to control the reverse channel amplifier gain factor, wherein the reverse channel gain setting module sets the reverse channel amplifier gain factor to a first value when the receive signal strength is below a first threshold, and sets the reverse channel amplifier gain factor to zero when the receive signal strength is above the first threshold;
    a forward channel amplifier connected to the donor antenna to receive RF signals from the donor antenna, amplify the RF signals, and provide the amplified RF signals to the coverage antenna for transmission to the wireless communication device, the forward channel amplifier including a gain control input; and
    a forward channel gain setting module that receives the indication of signal strength measurements obtained from the receive signal strength measurement device, and connected to the forward channel amplifier gain control input to control the forward channel amplifier gain factor, wherein the forward channel gain setting module sets the forward channel amplifier gain factor to a first value when the receive signal strength is below a second threshold, and sets the reverse channel amplifier gain factor to zero when the receive signal strength is above the second threshold, wherein the second threshold is higher than the first threshold.

12. The cellular signal repeater device of claim 11, wherein the receive signal strength measurement device measures a signal power level in a cellular carrier frequency band.

13. The cellular signal repeater device of claim 11, wherein the first threshold is selected from the range of −75 dBm to −78 dBm.

14. The cellular signal repeater device of claim 11, wherein the forward channel gain setting module further includes hysteresis to prevent rapid toggling of the forward channel amplifier gain factor.

15. The cellular signal repeater device of claim 11, wherein the forward channel gain setting module provides a power down control indication when the receive signal strength is above the second threshold.

16. The cellular signal repeater device of claim 11, wherein the second threshold is selected from the range of −75 dBm to −82 dBm.

* * * * *